(12) United States Patent
Li et al.

(10) Patent No.: US 11,760,689 B2
(45) Date of Patent: Sep. 19, 2023

(54) METHODS OF REMOVING CHLORIDE FROM GYPSUM HAVING HIGH LEVEL OF CHLORIDE SALT

(71) Applicant: KNAUF GIPS KG, Iphofen (DE)

(72) Inventors: Qinghua Li, Rolling Meadows, IL (US); Ashish Dubey, Grayslake, IL (US); Mark Hemphill, Hawthron Woods, IL (US)

(73) Assignee: KNAUF GIPS KG, Iphonfen (DE)

( * ) Notice: Subject to any disclaimer, the term of this patent is extended or adjusted under 35 U.S.C. 154(b) by 48 days.

(21) Appl. No.: 17/643,523

(22) Filed: Dec. 9, 2021

(65) Prior Publication Data

US 2022/0324756 A1    Oct. 13, 2022

Related U.S. Application Data

(60) Provisional application No. 63/171,624, filed on Apr. 7, 2021.

(51) Int. Cl.
*C04B 11/00* (2006.01)
*B01J 20/08* (2006.01)
(Continued)

(52) U.S. Cl.
CPC ............. *C04B 11/007* (2013.01); *B01J 20/08* (2013.01); *B01J 20/103* (2013.01); *B01J 20/18* (2013.01); *B01J 20/28004* (2013.01); *B01J 20/28016* (2013.01); *B01J 20/28047* (2013.01); *B01J 20/28059* (2013.01); *B01J 20/3408* (2013.01);
(Continued)

(58) Field of Classification Search
CPC ............ C04B 11/007; C04B 2111/0062; C04B 28/144; B01J 20/08; B01J 20/103; B01J 20/18; B01J 20/28004; B01J 20/28016; B01J 20/28047; B01J 20/28059; B01J 20/3408; B01J 20/3433; B01J 20/3475; B01J 20/28019; B01J 20/28057
See application file for complete search history.

(56) References Cited

U.S. PATENT DOCUMENTS 7,641,764 B2    1/2010   Yoshida et al.
8,815,382 B2    8/2014   Robinson, Jr.
(Continued)

FOREIGN PATENT DOCUMENTS

CN    105328943 B       8/2018
CN    111606666 A   *   9/2020    ........... C04B 28/144
(Continued)

OTHER PUBLICATIONS

Jian et al. CN111606666A—English Translation (Year: 2020).*
(Continued)

*Primary Examiner* — Brian D Walck
*Assistant Examiner* — Jordan W Taylor
(74) *Attorney, Agent, or Firm* — Vorys, Sater, Seymour and Pease LLP; Pradip Sahu; Philip T. Petti

(57) ABSTRACT

Beads of materials such as activated alumina, zeolite and silica gel, are used as chloride salt absorbers. The beads are mixed with high-salt gypsum. After mixing for a short time, the mixtures are dried, and the beads and the powder are separated by using a sieve or other physical separation device resulting in a low-salt gypsum which can be used as a gypsum source to make gypsum wallboard.

18 Claims, 1 Drawing Sheet

(51) Int. Cl.
  *B01J 20/10* (2006.01)
  *B01J 20/18* (2006.01)
  *B01J 20/28* (2006.01)
  *B01J 20/34* (2006.01)
(52) U.S. Cl.
  CPC ....... *B01J 20/3433* (2013.01); *B01J 20/3475* (2013.01)

(56) References Cited

U.S. PATENT DOCUMENTS

| | | |
|---|---|---|
| 10,427,979 B2* | 10/2019 | Harrison .............. C04B 14/303 |
| 2006/0137276 A1 | 6/2006 | Hummel et al. |
| 2015/0027181 A1* | 1/2015 | Ginn ....................... C05D 3/02 71/26 |
| 2020/0055277 A1* | 2/2020 | Hemphill ................ B32B 29/06 |
| 2020/0055278 A1 | 2/2020 | Li et al. |

FOREIGN PATENT DOCUMENTS

| | | | |
|---|---|---|---|
| CN | 112341023 A * | 2/2021 | ........... C04B 11/005 |
| WO | 2020224120 A1 | 11/2020 | |

OTHER PUBLICATIONS

ISO 9277: 2010, Determination of the specific surface area of solids by gas adsorption, <https://www.iso.org/obp/ui/#iso:std:iso:9277:ed-2:v1:en>, retrieved from the Internet Mar. 4, 2021.

\* cited by examiner

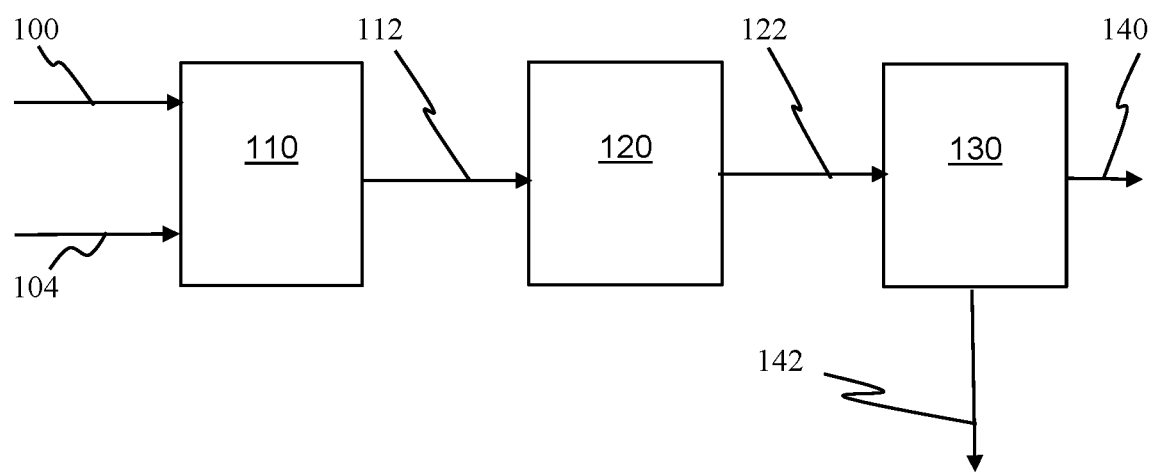

METHODS OF REMOVING CHLORIDE FROM GYPSUM HAVING HIGH LEVEL OF CHLORIDE SALT

FIELD OF THE INVENTION

The present invention relates to a method for removing chloride from synthetic gypsum and other gypsum sources having high chloride salt concentrations by treating the synthetic gypsum and other gypsum sources having high chloride salt concentrations with beads, prior to using the gypsum source to form the board core layer, to improve adhesion of the board core layer (gypsum core) to a back cover sheet relative to a gypsum board that is the same except that it lacks the beads. The present invention also provides a wall system for employing the gypsum board.

BACKGROUND OF THE INVENTION

In the construction of buildings, one of the more common building elements for construction and remodeling is gypsum wallboard, often known as drywall, gypsum boards, gypsum panels, gypsum paneling, and ceiling tiles. In chemical terms, gypsum is calcium sulfate dihydrate ($CaSO_4 \cdot 2H_2O$).

Set gypsum is a well-known material that is used in such products. Panels containing set gypsum are often referred to as gypsum boards, which contain a board core layer (set gypsum core) sandwiched between two cover sheets, particularly paper cover sheets. Such panels are commonly used in drywall construction of the interior walls and ceilings of buildings. One or more denser regions, often referred to as "skim coats," may be included as layers on either face of the board core layer, usually at an interface (bond surface) between the board core layer and an inner surface of a cover sheet. The denser regions may be contiguous with a less dense region of the gypsum core following setting of the gypsum.

During manufacture of a gypsum board, stucco (containing calcium sulfate hemihydrate), water, and other ingredients as appropriate may be mixed, typically in a mixer to form an aqueous gypsum slurry. The terms of art aqueous gypsum slurry or aqueous slurry or gypsum slurry are typically employed for the slurry both before and after the calcium sulfate hemihydrate converts to calcium sulfate dihydrate. The gypsum slurry is formed and discharged from the mixer onto a moving conveyor carrying a first cover sheet, optionally bearing a skim coat. If present, the skim coat is applied upstream from the location where the gypsum slurry is discharged onto the first cover sheet. After applying the gypsum slurry to the first cover sheet, a second cover sheet, again optionally bearing a skim coat, is applied onto the gypsum slurry to form a sandwich assembly having a desired thickness. A forming plate, roller or the like may aid in setting the desired thickness. The gypsum slurry is then allowed to harden by forming set (i.e., rehydrated) gypsum through a reaction between the calcined gypsum and water to form a matrix of crystalline hydrated gypsum (i.e., calcium sulfate dihydrate, also known as set gypsum). The desired hydration of the calcined gypsum promotes formation of an interlocking matrix of set gypsum crystals, thereby imparting strength to the gypsum board. Heat may be applied (e.g., using a kiln) to drive off the remaining free (i.e., unreacted) water to yield a dry product. Then the set gypsum product is cut to form gypsum boards of desired length.

Gypsum (calcium sulfate dihydrate and any impurities) suitable for use in wallboard may be obtained from both natural and synthetic sources, followed by further processing.

Natural gypsum may be used by calcining its calcium sulfate dihydrate to produce the hemihydrate form. Gypsum from natural sources is a naturally occurring mineral and can be mined in rock form. Naturally occurring gypsum is a mineral that is typically found in old salt-lake beds, volcanic deposits, and clay beds. When it is mined, raw gypsum is generally found in the dihydrate form. Gypsum is also known as calcium sulfate dihydrate, terra alba or landplaster. In gypsum, there are approximately two water molecules of water associated with each molecule of calcium sulfate.

Plaster of Paris is also known as calcined gypsum, stucco, calcium sulfate hemihydrate, or calcium sulfate half-hydrate.

When calcium sulfate dihydrate from either source is heated sufficiently, in a process called calcining or calcination, the water of hydration is at least partially driven off and there can be formed either calcium sulfate hemihydrate ($CaSO_4 \cdot \frac{1}{2}H_2O$) (typically provided in the material commonly referred to as "stucco") or calcium sulfate anhydrite ($CaSO_4$) depending on the temperature and duration of exposure. As used herein, the terms "stucco" and "calcined gypsum" refer to both the hemihydrate and anhydrite forms of calcium sulfate that may be contained therein. Calcination of the gypsum to produce the hemihydrate form takes place by the following equation:

$$CaSO_4 \cdot 2H_2O \rightarrow CaSO_4 \cdot 0.5H_2O + 1.5H_2O$$

Calcined gypsum is capable of reacting with water to form calcium sulfate dihydrate, which is a rigid product and is referred to herein as "set gypsum."

Gypsum may also be obtained synthetically (referred to as "syngyp", desulphurization gypsum or desulphogyspum or DSG in the art) as a by-product of industrial processes such as flue gas desulfurization from power plants, for example. Natural or synthetic gypsum can be calcined at high temperatures, typically above 150° C., to form stucco (i.e., calcined gypsum in the form of calcium sulfate hemihydrate and/or calcium sulfate anhydrite), which may undergo subsequent rehydration to form set gypsum in a desired shape, such as a board.

Synthetic gypsum obtained from power plants is usually suitable for use in gypsum panels intended for construction projects. In particular, flue gas including sulfur dioxide is wet scrubbed with lime or limestone, which produces calcium sulfite in the following reaction.

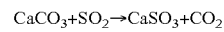

$$CaCO_3 + SO_2 \rightarrow CaSO_3 + CO_2$$

The calcium sulfite is then converted to calcium sulfate in the following reaction.

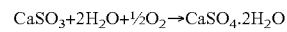

$$CaSO_3 + 2H_2O + \tfrac{1}{2}O_2 \rightarrow CaSO_4 \cdot 2H_2O$$

The hemihydrate form may then be produced by calcination in a similar manner to that used for natural gypsum.

However, many conventional coal-fired power plants are being shut down in favor of more environmentally friendly sources of energy. The shutdown of coal-fired power plants has created a growing shortage of synthetic gypsum suitable for producing gypsum panels. Lower quality synthetic gypsum is available from power plants and other sources, but this alternatively sourced gypsum often contains fairly high concentrations of extraneous salts, particularly magnesium or sodium salts, more particularly magnesium chloride and sodium chloride. Small amounts of potassium chloride and calcium chloride may also be present in alternatively sourced synthetic gypsum. The extraneous salts can be problematic due to their tendency to decrease adhesion between the board core and the cover sheets, particularly a back paper cover sheet.

US 2020/0055278 to Li et al discloses gypsum boards formed from synthetic gypsum and other gypsum sources having high chloride salt concentrations. Gypsum boards include a board core including set gypsum. A total concentration of the chloride anion in the board core ranges from about 500 ppm to about 3000 ppm, typically about 1000 ppm to about 3000 ppm, based on weight of the calcium sulfate hemihydrate. An inner surface of a front paper cover sheet contacts a first face of the board core. An inner surface of a back paper cover sheet contacts a second face of the board core. A starch layer coats the inner surface of at least one of the front and back cover sheet. Methods of making the gypsum board, and a wall system for employing the gypsum boards, are also provided.

US 2020/0055277 to Hemphill et al discloses gypsum boards formed from synthetic gypsum and other gypsum sources having high chloride salt concentrations. The gypsum boards include a set gypsum board core layer between a front and back paper cover sheets. The back paper cover sheet has a plurality of perforations extending therethrough. Methods of making the gypsum boards, and a wall system for employing the gypsum boards, are also provided. The concentration of the chloride anion in aqueous gypsum slurry used to make the set gypsum board core layer and to perform the methods of the invention may range from about 500 ppm to about 3000 ppm by weight calcium sulfate hemihydrate, typically from about 500 ppm to about 2000 ppm by weight calcium sulfate hemihydrate, more typically from about 500 ppm to about 1500 ppm by weight calcium sulfate hemihydrate.

WO 2020/224120 A1 discloses a high impurity ion content desulfurized gypsum paper-faced gypsum board and a manufacturing method therefor. The paper-faced gypsum board comprises a board core and protective paper outside the board core. Raw materials of the board core comprise 100 parts by weight of a desulfurized gypsum raw material and 0.5-10 parts by weight of zeolite. The desulfurized gypsum raw material is selected from any one or more of a high-sodium desulfurized gypsum raw material, a high-magnesium desulfurized gypsum raw material, a high-potassium desulfurized gypsum raw material, and a high-chlorine desulfurized gypsum raw material. The zeolite is a modified zeolite; or, an adsorption material is provided on one side of the protective paper in contact with the board core. Paragraph [0014] discloses that the adsorption material is selected from any one or more of zeolite, diatomaceous earth, fly ash, attapulgite clay, and bentonite. The desulfurized gypsum having high impurity ion content is used as a raw material of the paper-faced gypsum board. Paragraph [0013] discloses that the chloride ion content in the high-chloride desulfurization gypsum raw material is w, 421 mg/kg≤w≤8000 mg/kg (421 ppm≤w≤8000 ppm). The board core of the manufactured paper-faced gypsum board is asserted to not be stripped from the protective paper, and the bonding effect is asserted to be good.

High-salt is especially a problem for employing synthetic gypsum from sources such as waste from power plant flue gas desulfurization systems.

It will be appreciated that this background description has been created by the inventors to aid the reader, and is neither a reference to prior art nor an indication that any of the indicated problems were themselves appreciated in the art.

While the described principles can, in some regards and embodiments, alleviate the problems inherent in other systems, it will be appreciated that the scope of the protected innovation is defined by the attached claims, and not by the ability of the claimed invention to solve any specific problem noted herein.

BRIEF SUMMARY OF THE INVENTION

In one or more aspects of the invention, the invention provides methods for preparing a gypsum board from gypsum sources having significant quantities of one or more extraneous salts.

The present invention relates to methods for treating salt-containing gypsum sources containing calcium sulfate dihydrate and salts, particularly low-quality synthetic gypsum, to reduce the salt concentration. The invention particularly relates to methods for pretreating salt-containing gypsum sources containing appreciable quantities of extraneous salts, particularly chloride salts, and more particularly NaCl, KCl, $MgCl_2$ and/or $CaCl_2$). The method removes salts from salt-containing gypsum sources containing calcium sulfate dihydrate and salts by treating the salt-containing gypsum sources with salt removing beads prior to calcining the gypsum source. The calcining converts the calcium sulfate dihydrate of the gypsum source into calcium sulfate dihydrate to produce a stucco which contains the calcium sulfate hemihydrate.

The invention mixes high salt gypsum (containing calcium sulfate dihydrate) powder particles, as received, which naturally contain a small amount (e.g. 5-30 wt. %) of free moisture with beads which are dry (have an absence of moisture, in other words 0% water) or may have up to 30 wt. % free moisture, preferably 10 wt. % to 20 wt. % free moisture. By "as received" is meant the high salt gypsum as received from a power plant (in the instance of syngyp) or other source. The beads are supplied dry but preferably extra water is added to increase its moisture percentage before use in the method of the invention. This makes the method of the invention more efficient to absorb salt from the high salt gypsum powder particles. The mix ratio of the beads to the high salt gypsum powder particles is in the range of 5 to 50 parts by weight beads (including their free moisture) to 100 parts by weight high salt gypsum powder particles (including its free moisture).

In the context of beads, an as received condition (also termed "as-received beads) means beads exposed to ambient conditions. The beads typically employed in the present invention will absorb water molecules when they are exposed in the ambient condition. Depending on the exposed ambient condition, the free moisture in the beads will vary. In general, the beads contain <1% free moisture when kept in 75° F./30-40% RH. As received beads can be directly used for the present invention or they can be exposed to humidified conditions or otherwise wetted prior to use.

The invention uses beads made from inorganic materials such as activated alumina beads, zeolite beads, and/or silica gel beads to absorb chloride salts, for example. The sizes of the individual beads and the individual particles of gypsum powder do not overlap. In particular, the beads are bigger than the particles of gypsum powder. After mixing for a short time, the mixture is dried, and the treated gypsum powder particles are separated from the mixture by using a sieve or other physical separation apparatus. This results in separated amounts of the treated gypsum powder and the salt-laden beads. The separated treated gypsum may then be used for wallboard production. The separated beads are regenerated by washing for reuse in the method of the invention. The separated beads may be washed for example with water. The salt adsorption method can be repeated multiple times.

It was found that the beads remove a large amount of chloride salts from the high-salt gypsum and produce a low-salt gypsum useful for gypsum wallboard production.

The invention reduces the gypsum salt concentration from a high level, for example, greater than 3000 ppm chloride salt, to a lower salt concentration, for example less than 600 ppm chloride salt, preferably less than 300 ppm chloride salt, to be suitable for gypsum wallboard manufacture.

Thus, the invention provides a method of treating a salt-containing gypsum source comprising salt-containing gypsum powder particles, wherein the treating of the salt-containing gypsum powder particles comprises the steps of:

mixing chloride salt absorbing beads, which have an absence of moisture or up to 30% free moisture, typically 5-30 wt. % free moisture, preferably 10%-20% free moisture, with salt-containing gypsum powder particles, which contain 5-30 wt. % of free moisture, typically 10 wt. % to 20 wt. % free moisture, preferably 15 wt. % to 20 wt. % free moisture, for a time in a range of 5 minutes to 5 hours, preferably 30 minutes to 2 hours, at a mix ratio of the chloride salt absorbing beads to the high salt gypsum powder particles in a range 5 to 50 parts by weight beads to 100 parts by weight high salt gypsum particles on a moisture inclusive basis, to transfer chloride salt from the salt-containing gypsum powder particles to the chloride salt absorbing beads to produce a mixture of salt laden chloride salt absorbing beads and treated gypsum powder particles, wherein the salt laden chloride salt absorbing beads are all larger in particle size than the treated gypsum powder particles;

wherein the salt-containing gypsum powder particles comprise at least 80 wt. %, preferably at least 90 wt. %, calcium sulfate dihydrate on a dry basis, wherein the salt-containing gypsum powder particles comprise greater than 300 parts by weight chloride anion, typically about 500 parts by weight to about 3000 parts by weight chloride anion, per 1,000,000 parts by weight said salt-containing gypsum powder particles on a dry basis, wherein the salt-containing gypsum powder particles have a D50 median particle size of 10 to 100 microns, preferably median particle size of 30 to 50 microns, wherein the chloride salt absorbing beads comprise inorganic material selected from activated alumina, zeolite, and/or silica gel, wherein the chloride salt absorbing beads have a D50 median particle size of 0.5 mm to 5 mm, preferably 1 to 4 mm or 2 to 4 mm, and after said mixing, drying the mixture of the salt laden chloride salt absorbing beads and the treated gypsum powder particles and separating the treated gypsum powder particles from the salt laden chloride salt absorbing beads to recover the treated gypsum powder particles and recover the salt laden chloride salt absorbing beads.

The term bead in the context of the present invention, may be in the form of balls, extruded pieces or the like. Beads may be rounded. The beads generally have a length to diameter ratio of 1-3:1. The beads generally have a volume mean diameter, or a mean length (largest dimension when it is not spherical), of particle size of 0.5 mm to 5 mm, preferably 1-4 or more preferably 2-4 mm. Each bead can be made of thousands of small particles. These small particles can themselves be porous or nonporous. These small particles are bonded to form a "porous" bead. The term porous bead is meant to be a bead having a "porous" structure created from void spaces between the small particles and, if the small particles are also porous, the pores of the small particles themselves. The interstitial surface area of the voids and pores of the beads contributes to the specific surface area of the beads.

Specific surface area (SSA) is a property of solids defined as the total surface area of a material per unit of mass (S), (with units of $m^2/kg$ or $m^2/g$) or solid or bulk volume ($S_V$) (units of $m^2/m^3$ or $m^{-1}$). The specific surface area based on the solid volume is denoted by $S_O$. Typically the beads employed in the present invention have a specific surface area (S) of >20 $m^2/g$, more typically >50 $m^2/g$, furthermore typically >100 $m^2/g$, preferably >200 $m^2/g$. A number of international standards exist for the measurement of specific surface area, including ISO standard 9277 which is suitable for measuring specific surface area of beads of the present invention.

Fine materials will exhibit much greater specific surface area than will coarse materials. Some fine porous materials contain an enormous specific surface area. For example the specific surface area of sandstone may be in the order of 1500 $cm^2/cm^3$. The specific surface area of a porous material is affected by porosity, by mode of packing, by the grain size and by the shape of the grains. For example, disc shaped particles will exhibit a much larger specific area than will spherical ones.

The concentration of the chloride anion in the gypsum source (salt-containing gypsum powder particles) treated in the methods of the invention may range from greater than 300 parts by weight chloride anion, typically about 500 parts by weight to about 3000 parts by weight, per 1,000,000 parts by weight of the salt-containing gypsum powder particles on a dry basis. The concentration of the chloride anion in the gypsum source is more typically from about 800 parts by weight to about 2000 parts by weight, and further typically from about 1000 parts by weight to about 1500 parts by weight, per 1,000,000 parts by weight of the salt-containing gypsum powder particles on a dry basis. Gypsum having about 500 parts by weight to about 3000 parts by weight chloride anions on a dry basis means about 500 parts by weight to about 3000 parts by weight chloride anions without free moisture or any other water per 1,000,000 parts by weight gypsum without free moisture or any other water.

The chloride anion in the gypsum source used for methods and products of the invention may arise from any source. The gypsum source may be a synthetic gypsum source, particularly a low-quality synthetic gypsum obtained from a power plant flue gas stream. Typically, the one or more chloride salts are any of NaCl, KCl, $MgCl_2$, $CaCl_2$), or any combination thereof.

The salt adsorption method can be repeated multiple times to remove successively more salt from the gypsum particles. Thus, all or a portion of the separated treated gypsum particles can be recycled for additional treating with additional salt-absorbing beads. Also, the separated salt-absorbing beads may be regenerated by washing for reuse in the method of the present invention. The separated salt-absorbing beads may be washed for example with water.

The separated treated gypsum may then be calcined into stucco. The stucco may be used to make gypsum board by mixing with water to form an aqueous gypsum slurry and then forming the slurry into the shape of a board while allowing it to set such that the calcium sulfate hemihydrate converts to calcium sulfate dihydrate of the formed gypsum board.

In the present specification, a moisture inclusive basis means including free moisture. Free moisture is water that adheres to the gypsum structure or the chloride salt absorbing bead but is not chemically bound in the gypsum structure or the chloride salt absorbing bead. This free moisture can be removed by air-drying at temperature lower than 110° F. Free moisture is generally water that is naturally present in or on the salt-containing gypsum powder particles or the chloride salt absorbing beads. Typically the moisture from the salt-containing synthetic gypsum powder particles is from the flue gas desulfurization process from which they originated. However, the humidity present in the air of the surrounding natural atmosphere may contribute. The moisture from the chloride salt absorbing beads is due to the humidity present in the air of the surrounding natural atmosphere. However, the salt-containing gypsum powder particles or the chloride salt absorbing beads can be wetted, for example by spraying, with added water to each achieve up to 30 wt. % moisture. For example, if salt-containing gypsum powder particles have 30 wt. % moisture then, for 100 parts by weight of the salt-containing gypsum powder particles, 70 parts by weight is gypsum on a dry (water free) basis and 30 parts by weight is water. For example, if the chloride salt absorbing beads are dry (has 0 wt. % moisture) then, for 100 parts by weight of the chloride salt absorbing beads, 100 parts by weight is chloride salt absorbing beads on a dry (water free) basis and 0 parts by weight is water.

Unless specified otherwise, when the specification indicates a dry basis this is a water free basis. Thus, a dry basis is also a moisture free basis.

All average molecular weights, percentages and ratios used herein, are by weight (i.e., wt. %) unless otherwise indicated. When the specification indicates D50 it is Dn50 which is number D50. As is known in the art Dn50 is known as number median, it physically represents that each number of particles greater or smaller than such value takes account of 50% of the total particles number.

Advantages of the present invention may become apparent to those having ordinary skill in the art from a review of the following detailed description, taken in conjunction with the examples, and the appended claims. It should be noted, however, that while the invention is susceptible of various forms, the present disclosure is intended as illustrative, and is not intended to limit the invention.

BRIEF DESCRIPTION OF THE DRAWINGS

FIG. 1 shows a process flow diagram of the present method.

DETAILED DESCRIPTION OF THE INVENTION

The present invention provides the ability to treat chloride laden gypsum to remove at least a portion of the chloride and produce a treated gypsum having a lower level of chloride than prior to treatment.

The treated gypsum may be used in the board core layer of a gypsum board. Under ordinary circumstances, high salt concentrations in the board core layer may result in insufficient adhesion between the board core layer and at least one of the front cover sheet and the back cover sheet, particularly the back cover sheet. Treating the gypsum according to the invention to remove the chloride containing salt assists to solve this problem.

Method of Removing Chloride from Gypsum

FIG. 1 shows a process flow diagram of a method of the present invention. A stream of salt-containing gypsum powder particles 100 and a stream of chloride salt absorbing beads 104 feed a mixer 110, such as a shaker, in which they are mixed dry. Mixing dry means the gypsum powder particles and the beads are mixed with at most the free moisture water adhering to the gypsum powder particles and to the beads. They are not mixed in a liquid medium. For example, they are not mixed in an aqueous or non-aqueous slurry. Typically the gypsum powder particles and the beads are mixed for a time in a range of 5 minutes to 5 hours, preferably 30 minutes to 2 hours. During mixing a portion of chloride salt on the gypsum particles transfers to the beads. Then the mixed gypsum particles and beads discharge from the mixer 110 as a stream of a mixture of treated gypsum particles and chloride laden beads 112.

The stream of the mixture of treated gypsum particles and chloride laden beads 112 feeds a dryer 120 that removes any water adhering to the gypsum particles and the beads. The dryer 120 may be a kiln, an oven, hot air dryer, or other dryer. Then a stream of dried gypsum particles and the beads 122 discharges from the dryer 120 and feeds a physical separation device 130. A typical physical separation device 130 comprises a sieve. However, an air classifier or other physical separation device 130 may be employed. In the physical separation device 130 the treated gypsum particles, which are smaller than the salt-laden beads, are separated from the beads. This produces a salt laden bead stream 140 and a treated gypsum particles stream 142.

The salt adsorption method can be repeated multiple times. Thus, all or a portion of the separated treated gypsum 142 can be recycled for additional treating with additional salt-absorbing beads by the method of FIG. 1.

After separation the salt laden beads 140 may then be regenerated by washing (not shown) to remove the chloride, optionally dried, and then recycled for reuse in the method of FIG. 1 to treat gypsum particles. The salt laden salt-absorbing beads 140 may be washed, for example, by mixing with water, or otherwise cleaned, to remove the chloride salt.

Beads

The beads may be any one or more of activated alumina, zeolites, and silica gel. The beads typically have a D50 median particle size of 0.5-5 mm, preferably 1-4 mm or 2-4 mm. The beads typically have a specific surface area of >20 $m^2/g$, more typically >50 $m^2/g$, furthermore typically >100 $m^2/g$ or preferably >200 $m^2/g$. As mentioned above, each bead can be made of thousands of small particles. These small particles can be nonporous or porous materials. Activated alumina and silica gel particles are nonporous, but zeolite particles are porous.

The chloride salt absorbing beads fed to the method are all larger in particle size than the salt-containing gypsum powder particles fed to the method. Also, after mixing the chloride salt absorbing beads and the salt-containing gypsum powder particles, the resulting salt laden chloride salt absorbing beads are all larger in particle size than the treated gypsum powder particles. Thus, the particle size of each bead is larger than the particle size of each gypsum powder particle.

Silica Gel Beads

Silica gel is a granular, vitreous, porous form of silicon dioxide made synthetically from sodium silicate. Silica gel contains a nano-porous silica micro-structure suspended in a liquid. Silica gel beads, commonly used for removing moisture from packaging containers, may be calibrated with a coating of mineral salts to absorb or release humidity in various RH ranges, providing a buffering effect on relative humidity. This action referred to as two-way humidity control. Porous silica has a sponge structure, from which results a very high specific surface area, that varies greatly with pore size (from 20 to 750 m²/g). Typical silica gels have surface area >100 m²/g.

Activated Alumina Beads

Activated alumina is a highly porous form of aluminum oxide. Activated aluminate beads have a high specific surface area due to the many "tunnel like" pores that they have. Any suitable, activated alumina may be used. Suitable activated alumina is characterized as workable, or dehydrated with a loss on ignition (LOI) characteristic of preferably less than or equal to 20, and most preferably, an LOI of less than or equal to 10. The activated alumina may be manufactured by any process that produces a very large surface area on each particle of alumina, and the large surface area may be manifested by a very rough surface characterized by small pits, voids, and other surface irregularities. These surface irregularities may be effective at capturing small particles that impinge on the surface. Preferably, the activated alumina may be manufactured in such a way that the surface has a net negative electrical charge, thereby allowing positively charged ions, such as certain metals, to attach themselves to the activated alumina.

Activated alumina has a large specific surface area and is active in a reaction such as decomposition, isomerization, hydrogenation, dehydrogenation and dehydration. It is, therefore, generally used as a catalyst or catalyst support. Activated alumina is generally prepared by extracting alumina from an alumina-rich mineral such as bauxite, kaolin, acid white clay and colloidal clay; converting the alumina into alumina hydrate by hydrolysis or neutralization; and then activating the hydrate. Activated alumina contains 0 to 0.5 moles of water per one mole of $Al_2O_3$. The content varies depending on a process temperature during heating and dehydrating alumina trihydrate which is a starting material of the activated alumina.

In a Bayer process, the most typical process of the industrial preparation processes for alumina, bauxite as a starting material is ground and the resultant powder is treated with a hot solution of sodium hydroxide to elute alumina as sodium aluminate, during which the substantially whole amounts of impurities such as iron oxides, silica and titanium oxide are separated as an insoluble residue. If there exists alkali-soluble silica, it reacts with alkali and alumina to form an alkali aluminosilicate hydrate which is insoluble. The residue is removed by filtration and the filtrate, a sodium aluminate solution, is appropriately diluted. To the solution, a seed of gibbsite, which is crystalline alumina trihydrate, is added at an appropriate temperature. While stirring the mixture, aluminum hydroxide is precipitated. The precipitate is collected by filtration, washed with water and dried to give sodium-rich alumina trihydrate (gibbsite). The alumina trihydrate can be heated and dehydrated to give various activated aluminas containing 0 to 0.5 moles of water per 1 mole of $Al_2O_3$. In the course of conversion into a-alumina as anhydrous alumina by dehydration, there exist seven types of metastable aluminas, generally called activated alumina structures, including kappa-, theta-, delta, eta-, chi- and rho-alumina structures in addition to a typical gamma-alumina structure (See, for example, Publication Department, Kaken Research Center Management Development Center "Novel High Performance Adsorbents (Experimental Data Collection)", p. 361, published on Apr. 5, 1976).

A specific surface area in activated alumina is generally about 100 to 400 m²/g. In case that an average pore radius is 2.5 nm to 8.0 nm both inclusive, for example, a pore volume range is 0.125 to 0.4 mL/g when a specific surface area is 100 m²/g, and a pore volume range is 0.5 to 1.6 mL/g when a specific surface area is 400 m²/g. Activated alumina in which a specific surface area and a pore volume are within these ranges may be suitably used in the present invention.

Zeolite Beads

Typical zeolites suitable for the invention are commercially available 5A and 13X zeolite beads with the size of 2-4 mm. However, the invention can also use other types of zeolite as long as they are "bead" shape. The zeolite particle itself has a rigid, 3-dimensional crystalline structure (similar to a honeycomb) having a network of interconnected tunnels and cages. These tunnels and cages are nearly uniform, allowing the crystal to act as a molecular sieve.

Typical zeolite may comprise one or more zeolites such as "type-A zeolite", FAU zeolites (LSX, MSX, X, Y), LTA zeolites, CHA zeolites (chabazite), offretite, erionite, mordenite, gmelinite, mazzite, HEU zeolites (clinoptilolite), ZSM-3, EMT, EMC-2, ZSM-18, ZK5, ZSM-5, ZSM-11, Zeolite Beta, Zeolite type L, and mixtures of two or more of them, and more preferably from LSX, MSX, X, and X zeolites, and mixtures of two or more of them. Typical zeolite may comprise typically 12X, 3A, 4A and 5A zeolites, and mixtures of two or more of them. The various types of zeolites present in the zeolite are determined by XRD. The amount of zeolites is also measured by XRD and is expressed as % by weight relative to the total weight of the zeolite adsorbent material.

In the present description, the term "type-A zeolite" denotes an LTA zeolite. Typical zeolite may comprise type-A zeolite chosen from 3A, 4A and 5A zeolites. The term "3A" is intended to mean a zeolite of which the pore opening is equal to approximately 3 angstroms; the term "4A" is intended to mean a zeolite of which the pore opening is equal to approximately 4 angstroms; and the term "5A" is intended to mean a zeolite of which the pore opening is equal to approximately 5 angstroms.

The zeolite may comprise at least one cation chosen from the ions of groups IA, IIA, IIIA, IB, IIB and IIIB of the periodic table, the trivalent ions of the lanthanide or rare earth series, the zinc (II) ion, the silver (I) ion, the cupric (II) ion, the chromium (III) ion, the ferric (III) ion, the ammonium ion and/or the hydronium ion, the preferred ions being calcium, lithium, sodium, potassium, barium, cesium, strontium, zinc and rare-earth ions. The zeolite that can be used in the context of the present invention may comprise at least one alkali or alkaline-earth metal chosen from sodium, calcium, lithium, and mixtures of two or three of them in any proportion.

The agglomerated and formed zeolite adsorbent materials prepared according to any techniques known to those skilled in the art, such as extrusion, compacting, agglomeration on a granulating plate or granulating drum, atomization and the like. The proportions of agglomeration binder and of zeolites used are typically those of the prior art, that is to say between 5 parts and 30 parts by weight of binder per 95 parts to 70 parts by weight of zeolite.

The zeolite that can be used in the context of the present invention, whether it is in the form of balls, extruded pieces or the like, generally has a volume mean diameter, or a mean length (largest dimension when it is not spherical), of particle size of 0.5 mm to 5 mm, preferably 1-4 or more preferably 2-4 mm. Typically the zeolite beads have a specific surface area of >50 m²/g, more typically >100 m²/g.

Chloride Salts

The gypsum to be treated contains chloride anions. The chloride anions may arise from one or more chloride salts from any source. Generally, the one or more chloride salts are present in the gypsum source from which the gypsum particles were obtained. The gypsum source may be a synthetic gypsum source, particularly a low-quality synthetic gypsum obtained from a power plant flue gas stream. Such a low-quality gypsum source may not otherwise be suitable for forming a wall board without using at least one starch layer, according to the present invention.

The concentration of the chloride anion in the gypsum of gypsum feed stream 104 (FIG. 1) may range from greater than 300 parts by weight chloride anion, typically about 500 parts by weight to about 3000 parts by weight, more typically from about 800 parts by weight to about 2000 parts by weight, and further typically from about 1000 parts by weight to about 1500 parts by weight per 1,000,000 parts by weight said salt-containing gypsum powder particles on a dry basis. Gypsum having about 500 parts by weight to about 3000 parts by weight chloride anions on a dry basis means about 500 parts by weight to about 3000 parts by weight chloride anions for 1,000,000 parts by weight gypsum without free moisture or any other water.

Chloride salts are any salts which contain chloride. Thus, they include monovalent salts of chloride anion and a monovalent cation, such as sodium or potassium. Thus, they include divalent salts of chloride anions and a divalent cation, such as calcium or magnesium. Other chloride salts, are also contemplated, such as trivalent salts of chloride anions and a trivalent cation. Generally, the one or more chloride salts may be selected from the group consisting of NaCl, KCl, $MgCl_2$, $CaCl_2$) and any combination thereof.

Typically the method removes a sufficient amount of these chloride salts to produce treated gypsum particles having a chloride anion concentration which removes at least 25 wt. %, for example 50 to 99 wt % of the chloride anion from the gypsum particles fed to the method. Preferably the method removes at least 70 wt. %, for example, 75 to 95% wt. % of the chloride anion from the gypsum particles fed to the method.

In particular, the method removes at least 25 wt. %, typically 25 to 99. wt. %, for example 50 to 99 wt % or 25 to 50 wt. %, of the chloride anion from the gypsum particles fed to the method per pass through the method. By recycling all or a portion of the treated gypsum to be retreated, for instance one or two more times, according to the method of the invention, this can reduce chloride anion concentration in the gypsum by over 75% relative to the chloride anion concentration in the original gypsum prior to any treating according to the invention. Typically the method is run as a batch mode.

Uses of the Treated Gypsum

The synthetic gypsum and other gypsum particles that have been treated to reduce their high chloride salt concentrations according to the present invention may be calcined to convert the calcium sulfate dihydrate in the treated gypsum into stucco. This stucco may be employed in methods for preparing a gypsum board comprising mixing the stucco with water to make an aqueous gypsum slurry containing the calcium sulfate hemihydrate, and then depositing the aqueous gypsum slurry onto a gypsum board manufacturing line and allowing the deposited aqueous gypsum slurry to set to produce a core layer of the gypsum board.

In the manufacture of wallboard, stucco can be first mixed with dry additives such as perlite, starch, fiberglass, vermiculite or other additives known in the art. This dry mix can be combined with water, soap foam, accelerators and shredded paper, or pulpwood in a mixer at the head of a board forming line. The slurry is then spread between 2 paper sheets that serve as a mold. The edges of the paper can be scored, and sometimes chamfered, to allow precise folding of the paper to form the edges of the board. As the wet board travels the length of a conveying line, the calcium sulfate hemihydrate combines with the water in the slurry to form solid calcium sulfate dihydrate, or gypsum, resulting in rigid board. The board is typically rough-cut to length, and it typically enters a multideck kiln dryer, where it is dried. The dried board is typically conveyed to a board end sawing area and trimmed and bundled for shipment The calcium sulfate hemihydrate is present in the deposited aqueous slurry in amounts of at least 60 wt. % of the dry (water-free) materials of the aqueous slurry. Preferably the calcium sulfate hemihydrate is at least 70 wt. % of the dry (water-free) materials of the aqueous slurry, more preferably at least 80 wt. % of the dry (water-free) materials of the aqueous slurry. In typical wallboard formulations of the invention the dry (water-free) materials of the aqueous slurry have at least 90 wt. % or at least 95 wt. % calcium sulfate hemihydrate. Use of calcium sulfate anhydrite is also contemplated, although it is preferably used in small amounts of less than 20 wt. % of the dry (water-free) materials of the aqueous slurry.

Typically, the aqueous gypsum slurry has less than 10 wt. %, more typically an absence, of Portland cement or other hydraulic cement on a dry (water-free) basis. Typically, the aqueous gypsum slurry has less than 10 wt. %, more typically an absence, of fly ash on a dry (water-free) basis. Typically, the aqueous gypsum slurry has less than 10 wt. %, more typically an absence, of calcium carbonate on a dry (water-free) basis. For purposes of this disclosure a dry basis is a water-free basis.

The typical gypsum boards comprise a board core layer comprising:

a board core layer comprising set gypsum;

a front paper cover sheet having an outer surface and an inner surface, the inner surface contacting a first face of the board core layer; and a back paper cover sheet having an outer surface and an inner surface, the inner surface contacting a second face of the board core layer;

wherein the board core layer is disposed between the front paper cover sheet and the back paper cover sheet; and wherein the board core layer resulted from setting an aqueous slurry comprising water and stucco between the first cover sheet and the second cover sheet, wherein the stucco comprises calcium sulfate hemihydrate, and the aqueous slurry comprises at least 60 weight percent said calcium sulfate hemihydrate on a dry (water free) basis, and the water at a weight ratio of water to the calcium sulfate hemihydrate of 0.2:1 to 1.2:1.

One or both of the cover sheets may be paper cover sheets, which may be the same or different paper materials. Optionally, various additives known in the art may be present in the board core layer or a gypsum slurry used to form the board core layer. The board core layer may further comprise one or more high-density regions (layers) in contact with the inner surface of the front cover sheet or the back cover sheet and coated thereon. The one or more high-density regions may be in contact with a low-density interior of the board core layer.

Clauses of the Invention

The following clauses disclose various aspects of the invention.

Clause 1. A method of treating a salt-containing gypsum source comprising salt-containing gypsum powder particles, comprising:

mixing chloride salt absorbing beads, which have an absence of moisture or up to 30% free moisture, typically 5-30 wt. % free moisture, preferably 10%-20% free moisture, with salt-containing gypsum powder particles, which contain 5-30 wt. % of free moisture, typically 10 wt. % to 20 wt. % free moisture, preferably 15 wt. % to 20 wt. % free moisture, for a time in a range of 5 minutes to 5 hours, preferably 30 minutes to 2 hours, at a mix ratio of the chloride salt absorbing beads to the high salt gypsum powder particles in a range 5 to 50 parts by weight beads to 100 parts by weight high salt gypsum particles on a moisture inclusive basis, to transfer chloride salt from the salt-containing gypsum powder particles to the chloride salt absorbing beads to produce a mixture of salt laden chloride salt absorbing beads and treated gypsum powder particles, wherein the salt laden chloride salt absorbing beads are all larger in particle size than the treated gypsum powder particles;

wherein the salt-containing gypsum powder particles comprise at least 80 wt. %%, preferably at least 90 wt. %, calcium sulfate dihydrate on a dry basis, wherein the salt-containing gypsum powder particles comprise greater than 300 parts by weight chloride anion, typically about 500 parts by weight to about 3000 parts by weight chloride anion, per 1,000,000 parts by weight said salt-containing gypsum powder particles on a dry basis, wherein the salt-containing gypsum powder particles have a D50 median particle size of 10 to 100 microns, preferably D50 median particle size of 30 to 50 microns, wherein the chloride salt absorbing beads comprise inorganic material selected from activated alumina, zeolite, and/or silica gel, wherein the chloride salt absorbing beads have a D50 median particle size of 0.5 mm to 5 mm, preferably 1 to 4 mm or 2 to 4 mm, and after said mixing, drying the mixture of the salt laden chloride salt absorbing beads and the treated gypsum powder particles and separating the treated gypsum powder particles from the salt laden chloride salt absorbing beads to recover the treated gypsum powder particles and recover the salt laden chloride salt absorbing beads.

Clause 2. The method of clause 1, wherein the beads have a surface area of >20 m$^2$/g, more typically >50 m$^2$/g, furthermore typically >100 m$^2$/g, preferably >200 m$^2$/g.

Clause 3. The method of any of the preceding clauses, wherein the salt-containing gypsum powder particles have about 500 parts by weight to about 3000 parts by weight said chloride anion per 1,000,000 parts by weight of said gypsum particles fed to the mixer.

Clause 4. The method of any of the preceding clauses, wherein the free moisture in the beads fed to the mixer is in the range between 10 and 20% by weight.

Clause 5. The method of any of the preceding clauses, wherein the free moisture in the gypsum fed to the mixer is in the range between 15 and 20% by weight.

Clause 6. The method of any of the preceding clauses, wherein the beads and the gypsum particles are mixed at a mix ratio of the beads to the gypsum particles in a range 10 to 50 parts by weight beads (including their free moisture) to 100 parts by weight gypsum particles (including their free moisture).

Clause 7. The method of any of the preceding clauses, further comprising contacting the chloride laden beads with water to remove chloride from the chloride laden beads to produce cleaned beads.

Clause 8. The method of any of clauses 1 to 7, wherein the beads comprise activated alumina.

Clause 9. The method of any of clauses 1 to 7, wherein the beads comprise silica gel.

Clause 10. The method of any of clauses 1 to 7, wherein the beads comprise zeolite.

Clause 11. The method of any of the preceding clauses, wherein the chloride salt absorbing beads and the treated gypsum powder particles are separated by passing the mixture of the salt laden chloride salt absorbing beads through a sieve.

Clause 12. The method of any of clauses 7 to 11, further comprising recycling the cleaned beads as bead feed to the mixer.

Clause 13. The method of any of the preceding clauses, further comprising recycling the treated gypsum particles as gypsum particles feed to the mixer.

Clause 14. The method of clause 10, wherein the zeolite is chosen from zeolites type X, zeolites type A, zeolites type Y, FAU zeolites (LSX, MSX, X, Y), LTA zeolites, CHA zeolites (chabazite), offretite, erionite, mordenite, gmelinite, mazzite, HEU zeolites (clinoptilolite), ZSM-3, EMT, EMC-2, ZSM-18, ZK5, ZSM-5, ZSM-11, Zeolite Beta, Zeolite type L, and mixtures of two or more of them.

Clause 15. The method of clause 10, wherein the beads comprise zeolite 13X or zeolite 5A.

Clause 16. The method of any of the preceding clauses, wherein the gypsum is formed from synthetic gypsum comprising one or more chloride salts and said one or more chloride salts provide at least a portion of said chloride anions.

The following examples further illustrate the invention but, of course, should not be construed as in any way limiting its scope.

EXAMPLES

Raw Materials:

Four types of porous materials are tested. 1) Activated Alumina (AA) Beads: 2-5 mm bead size with surface are of >300 m$^2$/g surface area; 2) Silica gel (SiO$_2$) beads: 3 mm bead size with surface area of 500 m$^2$/g surface; 3) Zeolite 13X beads: 2-4 mm bead size with surface area of >400 m$^2$/g; 4) Zeolite 5A: 2-4 mm bead size with surface area >300 m$^2$/g.

High-Salt Synthetic Gypsum: (Syngyp) has chemical and physical compositions listed in TABLE 1.

TABLE 1

| Sample Description | High Salt Syngyp |
| --- | --- |
| Potassium (K+) | 67.4 ppm |
| Sodium (Na+) | 206.3 ppm |
| Magnesium (Mg2+) | 518.6 ppm |
| Chloride (Cl−) | 2045.2 ppm |
| Free Moisture % | 11.5% |
| Purity % | 97.1% |

Analytical Test Methods:

1. Pretreatment of Beads:

All of the beads are dried at 350° F. for 4 hours prior to the use. "Wet" beads can be made by keeping them in a humidified condition, such as in a 90° F. and 90% relative humidity (RH) room, or directly spraying water on them. Although not used in the examples, beads could have been be used in the as-received form as well. The examples showed that the dried beads and the "wetted" beads achieved beneficial results. The as-received beads are in between, in moisture content, "dried" and "wetted" beads. Thus, the inventors predict the as-received beads would also achieve beneficial results.

2. Pretreatment of High-Salt Syngyp Powder:

In all the examples, As-received High-Salt Syngyp powder (which may also be termed "As-is High-Salt Syngyp") contains 11.5 wt. % of free moisture. It can be directly mixed with the beads, or a small amount of extra water is added to increase its free moisture percentage before mixing with the beads.

3. Mixing in Gyro Mixer

The weight ratio of the beads and the High-salt Syngyp powder is between 10% and 30%, and the mixing time is between 5 and 30 minutes. The gyroscopic mixing simultaneously spins containers which contain the high-salt Syngyp particles and the beads vertically and horizontally to accomplish the mixing.

4. Drying and Separation

The mixtures of beads and the High-salt Syngyp powder are dried at 110° F. overnight, then the beads and the Syngyp powder are separated by using No. 20 Mesh sieve.

5. Chloride Measurement

Chloride test strips (available from HACH Company, Loveland, Colo.) are used to measure chloride levels before and after the absorption treatment.

Results:

1. Effect of types of beads on chloride reduction. TABLE 2 lists the effect of different beads on chloride reduction. It is shown that all the beads absorb the chloride from the as-received High-Salt Syngyp powder and reduce the chloride level in the High-Salt Syngyp powder. AA beads seem most effective among all the beads.

TABLE 2

Effect of different types of beads on the chloride reduction of High-salt Syngyp powder

| Dried Bead Types | Beads Weight (g) | As-received High-salt Syngyp (g) | Mixing Time (min) | Chloride in Syngyp (ppm) |
|---|---|---|---|---|
| — | — | 150 | — | 2020 |
| AA | 30 | 150 | 5 | 1422 |
| SiO2 | 30 | 150 | 5 | 1437 |
| Zeolite 13X | 30 | 150 | 5 | 1487 |
| Zeolite 5A | 30 | 150 | 5 | 1510 |

2. Effect of "wet" AA beads on chloride reduction. TABLE 3 lists the effect of moisture percentage of AA beads on the chloride reduction. It is shown that when the dried AA beads become the "wet" beads either by absorbing moisture in 90° F./90% RH condition or simply mixing them with water, the wet beads absorb more chloride than the dried beads. The optimized $H_2O$ % in AA beads is in the range between 10% and 20%. Note that in TABLE 3 Sample ID is listed with wt. % moisture. For example in Table 3, 9.9% AA means activated alumina with 9.9 wt. % moisture. This nomenclature is also used in other examples of this specification. In all the Examples, % is wt. % unless otherwise indicated.

TABLE 3

Effect of moisture wt. % of AA beads on chloride reduction

| Sample ID | Dried AA (g) | Wet AA in 90 F./ 90% RH (g) | Wet AA by spray (g) | H2O % to AA | Mixing Time (min) | [Cl] (ppm) |
|---|---|---|---|---|---|---|
| As-received High-Salt Syngyp | 30 | — | — | — | — | 2020 |
| 0% AA | 30 | 30 | — | 0.0 | 5 | 1422 |
| 9.9% AA | 30 | 30 | — | 9.9 | 5 | 1219 |
| 10.5% AA | 30 | 33.53 | — | 10.5 | 5 | 1000 |
| 15.7% AA | 30 | 35.57 | — | 15.7 | 5 | 925 |
| 16.6% AA | 30 | 35.99 | — | 16.6 | 5 | 925 |
| 27.1% AA | 30 | 41.13 | — | 27.1 | 5 | 1129 |
| 10% AA | 30 | — | 33 | 10 | 5 | 1129 |
| 15% AA | 30 | — | 34.5 | 15 | 5 | 999 |
| 20% AA | 30 | — | 36 | 20 | 5 | 1045 |

3. Effect of mixing time on chloride reduction. TABLE 4 lists the effect of mixing time on chloride reduction. It is shown that the chloride level in the High-salt Syngyp is reduced with increasing the mixing time.

TABLE 4

Effect of mixing time on the chloride reduction

| Sample ID | Dried AA (g) | Sprayed $H_2O$ (g) | H2O % to AA | As-received High-Salt Syngyp (g) | Mixing Time (min) | [Cl] (ppm) |
|---|---|---|---|---|---|---|
| 5 min-15% AA | 30 | 4.5 | 15% | 150 | 5 | 999 |
| 10 min-15% AA | 30 | 4.5 | 15% | 150 | 10 | 894 |

TABLE 4-continued

Effect of mixing time on the chloride reduction

| Sample ID | Dried AA (g) | Sprayed H₂O (g) | H2O % to AA | As-received High-Salt Syngyp (g) | Mixing Time (min) | [Cl] (ppm) |
|---|---|---|---|---|---|---|
| 20 min-15% AA | 30 | 4.5 | 15% | 150 | 20 | 718 |
| 30 min-15% AA | 30 | 4.5 | 15% | 150 | 30 | 575 |

5. Effect of mix ratio of AA to High-salt Syngyp on chloride reduction. TABLE 5 lists the effect of the mix ratio of AA beads to the High-Salt Syngyp on chloride reduction. It is shown that the chloride concentration in the High-Salt Syngyp reduces when the mix ratio of the beads to the powder is increased.

TABLE 5

Effect of mix ratio of AA to Syngyp on chloride reduction

| Sample ID | Dried AA (g) | As-received High-Salt Syngyp (g) | Mixing Time (min) | [Cl] (ppm) |
|---|---|---|---|---|
| 10% AA | 15 | 150 | 5 | 1662 |
| 20% AA | 30 | 150 | 5 | 1422 |
| 30% AA | 45 | 150 | 5 | 1045 |

6. Effect of "wet" High-salt Syngyp on chloride reduction. TABLE 6 lists the effect of free moisture percentage of the High-salt Syngyp on chloride reduction. It is shown that when the high-salt Syngyp contains 16~18% free moisture, more chloride can be absorbed than the As-received High-Salt Syngyp (11.5% free moisture). If the "wet" AA beads are mixed with the "wet" High-salt Syngyp, such as 16% High-salt Syngyp-15% AA, more chloride can be further absorbed than the dried AA beads mixed with the wet High-salt Syngyp, such as 16% High-salt Syngyp-0 % AA.

TABLE 6

Effect of Free moisture of Syngyp on the chloride reduction

| Sample ID | Dried AA (g) | H2O added in AA (g) | AA H2O % | As-received High-Salt Syngyp (g) | H2O added in Syngyp (g) | H2O % in Syngyp | Mixing Time (min) | [Cl] (ppm) | [Cl−] reduction % |
|---|---|---|---|---|---|---|---|---|---|
| As-is High-salt Syngyp | | | | 150 | | | | 2061 | |
| As received High-salt Syngyp-0% AA | 30 | 0 | 0 | 150 | 0 | 11.5% | 5 | 1422 | 31.0% |
| As-received High-salt Syngyp-15% AA | 30 | 4.5 | 15 | 150 | 0 | 11.5% | 5 | 999 | 51.5% |
| 16% High-salt Syngyp-0% AA | 30 | 0 | 0 | 150 | 8.04 | 16.0% | 5 | 960 | 53.4% |
| 16% High-salt Syngyp-15% AA | 30 | 4.5 | 15 | 150 | 8.04 | 16.0% | 5 | 847 | 58.9% |
| 18% High-salt Syngyp | 30 | 0 | 0 | 150 | 11.9 | 18.0% | 5 | 847 | 58.9% |

7. Effect of AA absorption cycles on the chloride reduction. TABLE 7 lists the effect of three cycles on the chloride reduction. After $1^{st}$ cycle of AA absorption, the chloride concentration is reduced from 2020 to 920 ppm. After $2^{nd}$ cycle, the chloride concentration is reduced from 920 to 478 ppm. After $3^{rd}$ cycle, the chloride concentration is reduced from 478 to 276 ppm, lower than 300 ppm.

TABLE 7

Effect of AA absorption cycles on the chloride reduction

| Sample ID | Dried AA (g) | H2O added in AA (g) | AA H2O wt % | High-salt Syngyp (g) | H2O added in High-salt Syngyp (g) | High-salt Syngyp H2O % | Mixing time (min) | [Cl] (ppm) | Cl reduction % |
|---|---|---|---|---|---|---|---|---|---|
| As received High-Salt Syngyp | 0 | 0 | 0% | 150 | 0 | | 0 | 2020 | |
| 1st Cycle | 30 | 4.5 | 15% | 150 | 8 | 16% | 5 | 847 | 58.9% |
| 2nd Cycle | 30 | 4.5 | 15% | 133 (1st Cycle powder) | 25 | 16% | 5 | 478 | 76.3% |
| 3rd Cycle | 30 | 4.5 | 15% | 133 (2nd Cycle powder) | 25 | 16% | 5 | 276 | 86.3% |

*Containing 11.5 wt. % free moisture

Variations of the specifically disclosed invention may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. "Bonding relation" does not mean that two layers are in direct contact. The terms "comprising," "having," "including," and "containing" are to be construed as open-ended terms (i.e., meaning "including, but not limited to,") unless otherwise noted. Recitation of ranges of values herein are intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The following claims also constitute disclosure of the present invention.

The invention claimed is:

1. A method of treating a salt-containing gypsum source comprising salt-containing gypsum powder particles, comprising:
    mixing chloride salt absorbing beads, which have 0 to 30% free moisture, with salt-containing gypsum powder particles, which contain 5-30 wt. % of free moisture, for a time in a range of 5 minutes to 5 hours, at a mix ratio of the chloride salt absorbing beads to the salt-containing gypsum powder particles in a range 5 to 50 parts by weight beads to 100 parts by weight salt-containing gypsum particles on a moisture inclusive basis, to transfer chloride salt from the salt-containing gypsum powder particles to the chloride salt absorbing beads to produce a mixture of salt laden chloride salt absorbing beads and treated gypsum powder particles, wherein the salt laden chloride salt absorbing beads are all larger in particle size than the treated gypsum powder particles;
    wherein the salt-containing gypsum powder particles comprise at least 80 wt. % calcium sulfate dihydrate on a dry basis,
    wherein the salt-containing gypsum powder particles comprise greater than 300 parts by weight chloride anion per 1,000,000 parts by weight said salt-containing gypsum powder particles on a dry basis,
    wherein the salt-containing gypsum powder particles have a D50 median particle size of 10 to 100 microns,
    wherein the chloride salt absorbing beads comprise inorganic material selected from activated alumina, zeolite, and/or silica gel,
    wherein the chloride salt absorbing beads have a D50 median particle size of 0.5 mm to 5 mm, and
    after said mixing, drying the mixture of the salt laden chloride salt absorbing beads and the treated gypsum powder particles and separating the treated gypsum powder particles from the salt laden chloride salt absorbing beads to recover the treated gypsum powder particles and recover the salt laden chloride salt absorbing beads.

2. The method of claim 1, wherein the chloride salt absorbing beads have a surface area of >20 m²/g.

3. The method of claim 1, wherein the salt-containing gypsum powder particles have about 500 parts by weight to about 3000 parts by weight said chloride anion per 1,000,000 parts by weight of said gypsum particles fed to the mixer.

4. The method of claim 1, wherein the chloride salt absorbing beads are fed to a mixer for said mixing of chloride salt absorbing beads with salt-containing gypsum powder particles, wherein the free moisture in the chloride salt absorbing beads fed to the mixer is in the range between 10 and 20% by weight.

5. The method of claim 1, wherein the salt-containing gypsum powder particles are fed to a mixer for said mixing of chloride salt absorbing beads with salt-containing gypsum powder particles, wherein the free moisture in the salt-containing gypsum particles fed to the mixer is in the range between 15 and 20% by weight.

6. The method of claim 1, wherein the beads and the gypsum particles are mixed at a mix ratio of the beads to the gypsum particles in a range 10 to 50 parts by weight beads which have 0 to 30% free moisture to 100 parts by weight gypsum particles which contain 5 to 30% free moisture.

7. The method of claim 1, further comprising contacting the salt laden chloride salt absorbing beads with water to remove chloride from the chloride laden beads to produce cleaned beads.

8. The method of claim 1, wherein the chloride salt absorbing beads comprise activated alumina.

9. The method of claim 1, wherein the chloride salt absorbing beads comprise silica gel.

10. The method of claim 1, wherein the chloride salt absorbing beads comprise zeolite.

11. The method of claim 1, wherein the chloride salt absorbing beads and the treated gypsum powder particles are separated by passing the mixture of the salt laden chloride salt absorbing beads through a sieve.

12. The method of claim 1, wherein the salt-containing gypsum powder particles are fed to a mixer for said mixing of chloride salt absorbing beads with salt-containing gypsum powder particles, further comprising recycling the cleaned beads as bead feed to the mixer.

13. The method of claim 1, wherein the salt-containing gypsum powder particles are fed to a mixer for said mixing of chloride salt absorbing beads with salt-containing gypsum powder particles, further comprising recycling the treated gypsum particles to the mixer.

14. The method of claim 10, wherein the zeolite is chosen from zeolites type X, zeolites type A, zeolites type Y, FAU zeolites (LSX, MSX, X, Y), LTA zeolites, CHA zeolites (chabazite), offretite, erionite, mordenite, gmelinite, mazzite, HEU zeolites (clinoptilolite), ZSM-3, EMT, EMC-2, ZSM-18, ZK5, ZSM-5, ZSM-11, Zeolite Beta, Zeolite type L, and mixtures of two or more of them.

15. The method of claim 10, wherein the chloride salt absorbing beads comprise zeolite 13X or zeolite 5A.

16. The method of claim 1, wherein the salt-containing gypsum powder particles are formed from synthetic gypsum comprising one or more chloride salts and said one or more chloride salts provide at least a portion of said chloride anions.

17. The method of claim 1, wherein the chloride salt absorbing beads have an absence of moisture.

18. The method of claim 1, wherein the salt-containing gypsum powder particles comprise at least 90 wt. % calcium sulfate dihydrate on a dry basis.

\* \* \* \* \*